US012541796B2

(12) United States Patent
Clark et al.

(10) Patent No.: US 12,541,796 B2
(45) Date of Patent: *Feb. 3, 2026

(54) SYSTEM AND METHOD FOR IMPLEMENTING A TRUST DISCRETIONARY DISTRIBUTION TOOL

(71) Applicant: JPMorgan Chase Bank, N.A., New York, NY (US)

(72) Inventors: Adam Leonard Harry Clark, Upper Saddle River, NJ (US); Jayson Lashin, Jericho, NY (US); Girija Penumarti, East Brunswick, NJ (US); Mindy Zhou, New York, NY (US); Loryfel Nunez, New York, NY (US); Fei Feng, Harrison, NJ (US); Parivesh Priye, Cupertino, CA (US); Lauren Mitchell, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 341 days.

This patent is subject to a terminal disclaimer.

(21) Appl. No.: 18/129,270

(22) Filed: Mar. 31, 2023

(65) Prior Publication Data

US 2023/0237583 A1    Jul. 27, 2023

Related U.S. Application Data

(63) Continuation of application No. 16/369,435, filed on Mar. 29, 2019, now Pat. No. 11,645,716.
(Continued)

(51) Int. Cl.
  *G06F 17/00*  (2019.01)
  *G06F 17/18*  (2006.01)
(Continued)

(52) U.S. Cl.
  CPC ............ *G06Q 40/06* (2013.01); *G06F 17/18* (2013.01); *G06F 18/214* (2023.01);
(Continued)

(58) Field of Classification Search
  CPC ........ G06Q 40/06; G06N 20/00; G06N 5/045; G06F 18/2178; G06F 18/214; G06F 17/18; G06F 40/20
(Continued)

(56) References Cited

U.S. PATENT DOCUMENTS

| 7,580,877 B1 * | 8/2009 | Argenbright | ........... G06Q 40/10 705/37 |
| 2013/0054489 A1 * | 2/2013 | Armand | ................. G06Q 40/06 705/36 R |

(Continued)

*Primary Examiner* — Jason T Edwards
(74) *Attorney, Agent, or Firm* — Greenblum & Bernstein, P.L.C.

(57) ABSTRACT

An embodiment of the present invention is directed to automated trust discretionary distribution decisions. The innovative system comprises a computer server configured to perform the steps of: receiving, via an electronic input, a trust beneficiary cash distribution request relating to a trust instrument; responsive to the trust beneficiary request, obtaining trust details relating to the trust instrument; applying, via a computer server, a trust decision predictor to the distribution request to generate a trust decision wherein the trust decision predictor considers a set of decision factors comprising the trust beneficiary cash distribution request, beneficiary details, trust details and applicability of governing restrictions; presenting, via an electronic interface, the trust decision; automatically executing the trust decision; and applying feedback data to refine and standardize the trust decision predictor.

18 Claims, 4 Drawing Sheets

Related U.S. Application Data

(60) Provisional application No. 62/650,332, filed on Mar. 30, 2018.

(51) Int. Cl.
*G06F 18/21* (2023.01)
*G06F 18/214* (2023.01)
*G06N 5/045* (2023.01)
*G06N 20/00* (2019.01)
*G06Q 40/06* (2012.01)
*G06F 40/20* (2020.01)

(52) U.S. Cl.
CPC ......... *G06F 18/2178* (2023.01); *G06N 5/045* (2013.01); *G06N 20/00* (2019.01); *G06F 40/20* (2020.01)

(58) Field of Classification Search
USPC .......................................................... 706/45
See application file for complete search history.

(56) References Cited

U.S. PATENT DOCUMENTS

| | | | |
|---|---|---|---|
| 2015/0039334 A1 | 2/2015 | De Traversay | |
| 2015/0081542 A1 | 3/2015 | Brereton | |
| 2015/0142661 A1* | 5/2015 | Jain | G06Q 20/102 |
| | | | 705/35 |
| 2017/0330109 A1* | 11/2017 | Maughan | G06N 5/04 |
| 2018/0322584 A1* | 11/2018 | Crabtree | G06N 5/045 |
| 2018/0349991 A1* | 12/2018 | Fidanza | G06Q 20/102 |
| 2021/0090191 A1* | 3/2021 | Chan | G16H 40/67 |

* cited by examiner

SYSTEM AND METHOD FOR IMPLEMENTING A TRUST DISCRETIONARY DISTRIBUTION TOOL

CROSS REFERENCE TO RELATED APPLICATIONS

This application is a Continuation of U.S. patent application Ser. No. 16/369,435, filed on Mar. 29, 2019, which claims priority to U.S. Provisional Application 62/650,332, filed Mar. 30, 2018. The disclosure of each of these documents, including the specification, drawings, and claims, is incorporated herein by reference in its entirety.

FIELD OF THE INVENTION

The invention relates generally to a system and method for implementing a trust discretionary distribution tool that automates decision making and analysis.

BACKGROUND OF THE INVENTION

Trust beneficiary cash distribution requests are formally documented and approved or denied by a trust officer. The decision making is at the trust officer's discretion and oftentimes, personal bias and experiences will affect the ultimate decisions. There is a current need to create consistency in the decision making so that the approval and rejection criteria based on trust agreements are clear. For example, a trust beneficiary may contact a trust officer and request an amount of money to purchase a new car. In response, the trust officer may analyze the trust document to decide whether the request is an eligible request. This may require the trust officer to determine whether the request is reasonable under the terms of the trust and in line with the grantor's goals and the beneficiary's best interest. The determination may also consider the trust situation, background of the beneficiary, current circumstances, etc. The current process is highly subjective and prone to inconsistencies.

These and other drawbacks exist.

SUMMARY OF THE INVENTION

According to one embodiment, the invention relates to a system that implements an automated trust discretionary distribution decisions. The system comprises: a memory component that stores trust historical data; and a computer server coupled to the memory, the computer server comprising a programmed computer processor configured to perform the steps of: receiving, via an electronic input, a trust beneficiary cash distribution request relating to a trust instrument; responsive to the trust beneficiary request, obtaining trust details relating to the trust instrument; applying, via a computer server, an automated data validator that validates whether the request has complete and valid input data points, a trust decision predictor to the distribution request to generate a trust decision wherein the trust decision predictor considers a set of decision factors comprising the trust beneficiary cash distribution request, beneficiary details, trust details and applicability of governing restrictions presenting, via an electronic interface, the trust decision; automatically executing the trust decision; and applying feedback data to refine and standardize the trust decision predictor. The trust decision predictor may also list the contributory decision factors or decision rationale. For model interpretability, factors that contributed to each predicted decision may be identified.

The system may include a specially programmed computer system comprising one or more computer processors, interactive interfaces, electronic storage devices, and networks.

According to one embodiment, the invention relates to a method that implements an automated trust discretionary distribution decisions. The method comprises the steps of: receiving, via an electronic input, a trust beneficiary cash distribution request relating to a trust instrument; responsive to the trust beneficiary request, obtaining trust details relating to the trust instrument; applying, via a computer server, a trust decision predictor to the distribution request to generate a trust decision wherein the trust decision predictor considers a set of decision factors comprising the trust beneficiary cash distribution request, beneficiary details, trust details and applicability of governing restrictions; presenting, via an electronic interface, the trust decision; automatically executing the trust decision; and applying feedback data to refine and standardize the trust decision predictor.

The computer implemented system, method and medium described herein provide unique advantages to entities, organizations and other users, according to various embodiments of the invention. The innovative system achieves significant efficiencies by shortening the time to make trust beneficiary distribution decisions from weeks/months to minutes. The system further realizes consistency and uniformity in rendering distribution decisions. The innovative system may integrate with broader Trust Distribution transactional and reporting systems. An embodiment of the present invention may be implemented for wealth management trust businesses and also packaged into a product which may be used with other trusts and estates entities worldwide. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
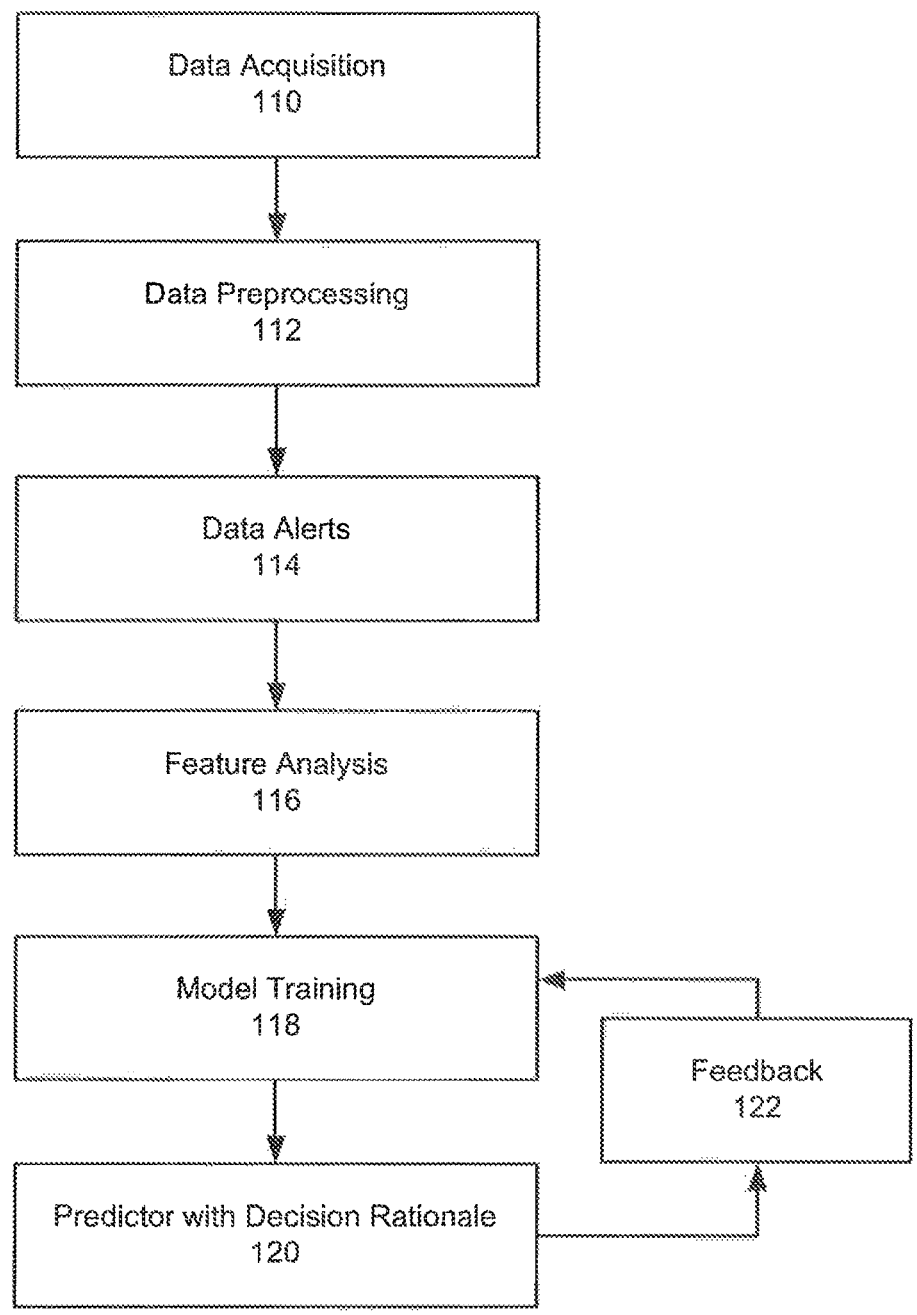
FIG. 1 is an exemplary flow diagram, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Trust instruments usually give guidance regarding the types of discretionary distributions a trustee can make to beneficiaries. Discretionary powers may be defined in the trust instrument but generally these powers are subject to interpretation. Discretionary powers are often used when making distributions to the beneficiary regarding health, education, maintenance and support. To make such distribution decisions, a trustee may consider the size of the trust, distribution request, patterns of distribution, beneficiary needs as well as long-term sustainability of the trust.

An embodiment of the present invention is directed to an automated system that intelligently generates trust distribution decisions based on various influencing factors from distribution requests. The innovative system utilizes a supervised learning method coupled with Natural Language Processing (NLP) to learning from historical decisions made by Trust officers over time. An embodiment of the present invention considers the free-form textual context of the Trust distribution requests and highly discretion based distribution decisions and also selected provision from Trust Governing Instruments that may influence discretionary decision making. An embodiment of the present invention leverages key factors as features for a model which may include distribution request background, beneficiary background, correlations amongst request, trust provision, trust officer's decision rationale and additional factors such as trust value, amount requested, distribution type (e.g., principal, income, etc.), request type (e.g., blanket, one-time, etc.).

An embodiment of the present invention may be directed to a tool that formally requests and documents approval or denial of an action that requires a trustee, e.g., Corporate Trustee, to exercise discretion. For example, an embodiment of the present invention may capture background information of the Cash Distribution request by beneficiary. In this example, free form comments may be considered vital given the unique nature of requests by beneficiaries. The discretionary distribution process may consider the number of beneficiaries, history of discretionary action requests (DAR), cash distribution decisions, trust situation, other sources of income, tax, expenses, etc.

An embodiment of the present invention may also recognize patterns and further compare and/or refine patterns based on similar requests, events and/or circumstances. The system may analyze metrics and various sources of data. For example, the system may consider social media data to verify and legitimize requests. In this example, social media activity may be used to confirm and/or contradict certain requests. The system may use public data to verify events, a requester's need and/or other independently verifiable data (e.g., travel plans, purchases, etc.).

The system may provide funds directly to a receiving entity (instead of the requester). For example, the system may receive a request to purchase a new car for $50,000. Once approved, the system may transfer funds for the purchase of a specific car to the car dealer (instead of sending the funds to the requester). In addition, an embodiment of the present invention may apply Blockchain to the payments to ensure security and that the funds are received by an intended recipient.

An embodiment of the present invention utilizes Artificial Intelligence (AI) Natural Language Capabilities to gain deeper insights into discretionary requests. For example, an embodiment of the present invention may intelligently extract reasons for a request category, e.g., living expenses, educational related expenses, etc. An embodiment of the present invention provides deeper insights compared to traditional tools which are not able to read through the texts.

An embodiment of the present invention may be directed to a system that provides an online portal or other web interface where distribution requests may be made electronically. For example, a requester may access an online portal and make requests using a drop down menu (or other user interface) to identify a distribution need and where the distribution should go. Depending on the complexity of the request, other forms or data may be provided. For example, if a request involves $100 for a medical procedure, the response may be made immediately. If the request involves $5 million dollars for seed capital, the system may require supporting documentation (e.g., business plan, presentations, statements, etc.) that may be communicated to the system (e.g., uploaded, emailed, electronically transmitted via a link, etc.). Decisions may be presented via the same online portal or via other forms of communication, such as email, text, message, voicemail, etc. The system may also provide the ability to view prior trust distributions and further analyze and develop trends and patterns.

An embodiment of the present invention may be applied to the execution of the funds, e.g., back-end funding decisions. For example, when a request is made, the system may determine how to best access the funds for distribution. The system may decide which accounts to retrieve the funds from—whether the funds should be accessed from a principle account or income account. An embodiment of the present invention may determine how to best create liquidity from the investments. This may also consider tax efficiencies and other considerations for the portfolio. The system may further consider whether an item (e.g., art, furniture, jewelry, property, etc.) should be sold to create additional cash and which decision is the most tax efficient or beneficial. In addition, an embodiment of the present invention may consider timing issues and benefits. The system may also access historical data and also data that indicates an optimal decision based on aligned goals and purposes. Other considerations may be analyzed to develop an optimal funding strategy.

An embodiment of the present invention may provide guidance to a trust officer or other representative or agent. According to another example, the system may be a fully automated system. According to yet another example, the system may be a hybrid system where certain requests (e.g., complex, high dollar amount, etc.) are forwarded to a trust officer and others are handled automatically. For example, the system may identify a specific distribution request that requires expertise in a particular area and then forward the request to a trust officer with the requisite knowledge and experience.

An embodiment of the present invention may also adapt to changing laws, regulations and/or other considerations that have an impact on trust decisions. For example, a case may have a global impact on trust decisions having a specific fact pattern. An embodiment of the present invention may identify other trust situations that may be impacted by the case. This may also apply to changes in rules, state law, regulations, governing documents, etc. For example, a rule change may alter how expenses may be allocated in a trust.

FIG. 1 is an exemplary flow diagram, according to an embodiment of the present invention. At step 110, data may be acquired. At step 112, data may be processed. The data may include unstructured data and structured data. At step 114, features may be analyzed. At step 116, a model may be selected and trained. At step 118, the model may be evaluated. The order illustrated in FIG. 1 is merely exemplary.

While the process of FIG. 1 illustrates certain steps performed in a particular order, it should be understood that the embodiments of the present invention may be practiced by adding one or more steps to the processes, omitting steps within the processes and/or altering the order in which one or more steps are performed.

An embodiment of the present invention is directed to automating Trust Discretionary Cash Distribution decision making processes. This may be considered a classic binary Classification Problem where classification labels may include "Request APPROVAL" or "Request DENIAL." An embodiment of the present invention may leverage historical trust decision data for training, testing and/or evaluating supervised machine learning models. An embodiment of the present invention may use structured data points as features. Furthermore, an embodiment of the present invention may use Natural Language Processing (NLP) techniques to extract features from free form text from the discretionary action request (DAR) data to augment a feature list. Other techniques may be implemented in accordance with the various embodiments of the present invention.

At step 110, data may be acquired. The data may be acquired from various sources and may include structured and/or unstructured data from DAR application databases and other sources. Structured data may include size of the trust and amount requested by the beneficiary. Unstructured data may include free form comments relating to information about the beneficiary, trust agreement, cash distribution request and/or other related data. An embodiment of the present invention may attach labels (or tags) to the gathered data. The data gathered may also contain a final disposition of the discretionary request. The decision may be an APPROVAL or a DENIAL. An embodiment of the present invention may use this as labelled data for supervised Machine Learning.

An embodiment of the present invention may identify key factors that have an impact on discretionary request. For example, the key factors may be extracted from DAR Comments/Text and DAR data Values, e.g., the key words in comments across Request Background, Beneficiary Background, Decision, Correlation between Request to Provision, Trust Value, Amount Requested, Source Distribution Type (e.g., principal, income), Distribution Type (e.g., blanket, one-time), etc. The system may then convert the attributes into a format that a Machine Learning algorithm may take in as an input.

At step 112, the data may be processed. As discussed above, the data may include unstructured data and structured data. DAR requests may have fields that have free form comments as values. For example, document fields may include Purpose, Background and Provision. Purpose may describe the purpose of a cash distribution request. Background may identify the background of the beneficiary. Provision may indicate the relevant provision from the governing Trust Document that is deemed important or relevant.

An embodiment of the present invention may implement NLP techniques including keyword extraction, vocabulary building for sentiment analysis and/or document similarity.

For keyword extraction, an embodiment of the present invention may construct a graph of words occurring in a defined window. Graph may represent text and interconnect words or other text entities with meaningful relations. In addition, keyword extraction may consider how important a word is to a document (or other collection of text). This may be represented by term or word frequency. According to another example, inverse document frequency to be applied to find a discriminating power of a word. An embodiment of the present invention may then rank the words, represented as graph vertices, and return highest scoring vertices as the extracted keywords from a document. This graphical representation of words may consider word importance based on context and therefore semantically more meaningful.

For vocabulary building for sentiment analysis, after extracting keywords, an embodiment of the present invention may create a vocabulary of POSITIVE Keywords and NEGATIVE keywords from a corpus of a Trust Training Data Set. For example, positive keywords may represent keywords that occur in APPROVED requests and negative keywords may represent keywords that occur in DENIED requests. An embodiment of the present invention may also create a custom stop-word list to disregard common words in the Trust Domain.

For document similarity, an embodiment of the present invention may recognize that the more similar a cash distribution request was to its trust provision, the higher the chances of its approval because the trust document governs trust related transactions, including cash distributions. According to an exemplary application, an embodiment of the present invention may use cosine similarity to get the document similarity score of the request purpose to the trust document provision. Cosine similarity represents a metric used to measure how similar documents are irrespective of their size. Other measurements of similarity may be implemented.

An embodiment of the present invention may consider structured data points such as Size of the Trust and Amount Requested. The system may also use categorical data points such as Type of Distribution (e.g., One-Type, Blanket, etc.) and Source of Distribution (e.g., Principal, Income or Both).

At step 114, Data Alerts may be defined and applied. Data Alerts may be based on a predetermined condition, e.g., data is missing, request has special characteristics that merit more review, special needs trust, explicit restrictions, relates to a depleting trust, etc.). For example, data alerts may be based on whether a high request ratio is identified. This may involve determining if a requested amount exceeds a percentage of a trust value. Another data alert may include whether a requester is not the actual recipient. The system may determine whether the requested amount is anomalous, which may be based on data analysis work and whether the requested amount is several standard deviations away from the requested amount for the same category. Other data alerts may be based on whether the trust account has an existing open blanket for a similar purpose; whether specific restrictions apply in the governing instrument and whether the beneficiary has other sources of income.

At step 116, features may be analyzed. An embodiment of the present invention may identify candidate features and run a correlation analysis to see if they are correlated to a DAR outcome. For example, the system may start off with more than 20 possible features and settled on 11 features after the correlation analysis. Exemplary features may include the following:

Actual Requested Amount—actual requested amount by beneficiary;
Alternative Asset Market Value—Non liquid asset values;
Negative Sentiment Score from Beneficiary Background;
Negative Sentiment Score from Purpose of the Request;
Net Income—for income generating trusts;
Purpose of Request Categories;
Total Trust Market Value;
Region—North American regions where the Trust is situated;

Sources of Cash Distribution—One time, recurring, blanket distributions;
Sources of Distribution—Income, Principal and Income & principal;
Total Number of Beneficiaries.

Other features may be defined and applied according to various other applications and environments.

Each DAR Request may be converted into a vector of values where the vector represents the chosen features. The illustration below is a sample vector of values from unstructured and structured data.

| Source Dist. | Trust Values | Amount | Dist-Type | Category | Deny Score Bg | Approve Score Bg |
|---|---|---|---|---|---|---|
| 2 | 214104.50 | 36671.24 | 4 | 3 | 3 | 2 |
| 1 | 45886.45 | 6519.48 | 4 | 3 | 6 | 6 |

| Source Dist. | Deny Score Purpose | Approve Score Purpose | Hop Score (purpose to provision) |
|---|---|---|---|
| 2 | 1 | 1 | 0.068932 |
| 1 | 6 | 5 | 0.482199 |

At step 118, a model may be selected and trained. Once key factors are identified, an embodiment of the present invention may feed them into classification algorithms, e.g., Logistic Regression, K-Nearest Neighbors, Naïve Bayes, SVM (Support Vector Machine) and Decision Tree.

At step 120, a predictor may be applied with decision rationale. The trust decision predictor may identify contributory decision factors. For model interpretability, factors that contributed to each predicted decision may be identified. For example, rationale for confirming a denial or an approval may include rationale related to the request, distribution, trust situation, background beneficiary and governing instrument. Rationale relating to the request may include: request is not appropriate; issue with use of funds; request has weak or incomplete supporting documentation or evidence; request is consistent with governing documents; emergency situation; risk mitigated with consent or release; request is for primary or appropriate beneficiary; etc. Rationale relating to the distribution may include: existing mandatory distribution covering the request or need; existing discretionary distribution covering the request or need; existing blanket or recurring distribution covering the request or need; etc. Rationale relating to the trust situation may include: amount is not appropriate; deleting trust; impact of interests of multiple beneficiaries; trust is financially able to support distribution; size of trust; etc. Rationale relating to the beneficiary background may include: other sources of income or assets; etc. Rationale relating to the governing instrument may include: inconsistency or consistency with governing document terms/standards for distribution; etc.

At step 122, a feedback from Model Evaluation to Model Training may be applied.

According to an exemplary embodiment, the model may be evaluated and tested against trust officer decisions. An embodiment of the present invention may provide an additional layer of verification for a corpus of Trust Discretionary Distribution Requests. From a process perspective, an embodiment of the present invention may include an additional layer of verification when a Trust Distribution Request may be added to training data.

An embodiment of the present invention may be directed to improving metrics. For example, the system may implement boosting techniques, such as boosted trees, to increase accuracy. An embodiment of the present invention may also utilize Deep Learning Models. An embodiment of the present invention may also analyze other machine learning (ML) metrics. For example, the system may use standard model accuracy and confusion matrix. An embodiment of the present invention may analyze other ML metrics such as Area Under ROC Curve (AUC) often used as a measure of quality of the ML classification models as well as logarithmic loss. An embodiment of the present invention may be directed to using the AUC to find various threshold settings of ML metrics in order to find the optimal models.

An embodiment of the present invention may be directed to enhancing the algorithm to clean up and/or add new features. Features may be conflated into one metric to avoid hints of correlation among features.

An embodiment of the present invention may be directed to improving a keyword extraction algorithm. An embodiment of the present invention may apply intelligent mining techniques to search for stopwords, aside from using standard term frequencies in the vocabulary. Aside from filtering on POS tagging for keyword extraction, the system may experiment with positional scores (e.g., score candidate keywords higher if they appear in a certain way in the document).

An embodiment of the present invention may be directed to improving a sampling methodology as well. For example, the system may recognize an unbalanced class problem with "Approval" cases outnumbering "Denial" cases. The system may use a straightforward approach of evenly sampling among the two classes, thus under-sampling the Approved cases. An embodiment of the present invention may use other techniques to address imbalanced classes. These techniques may include, but are not limited to, k-means cluster centroids sampling and one-side selection sampling.

Figure 2:
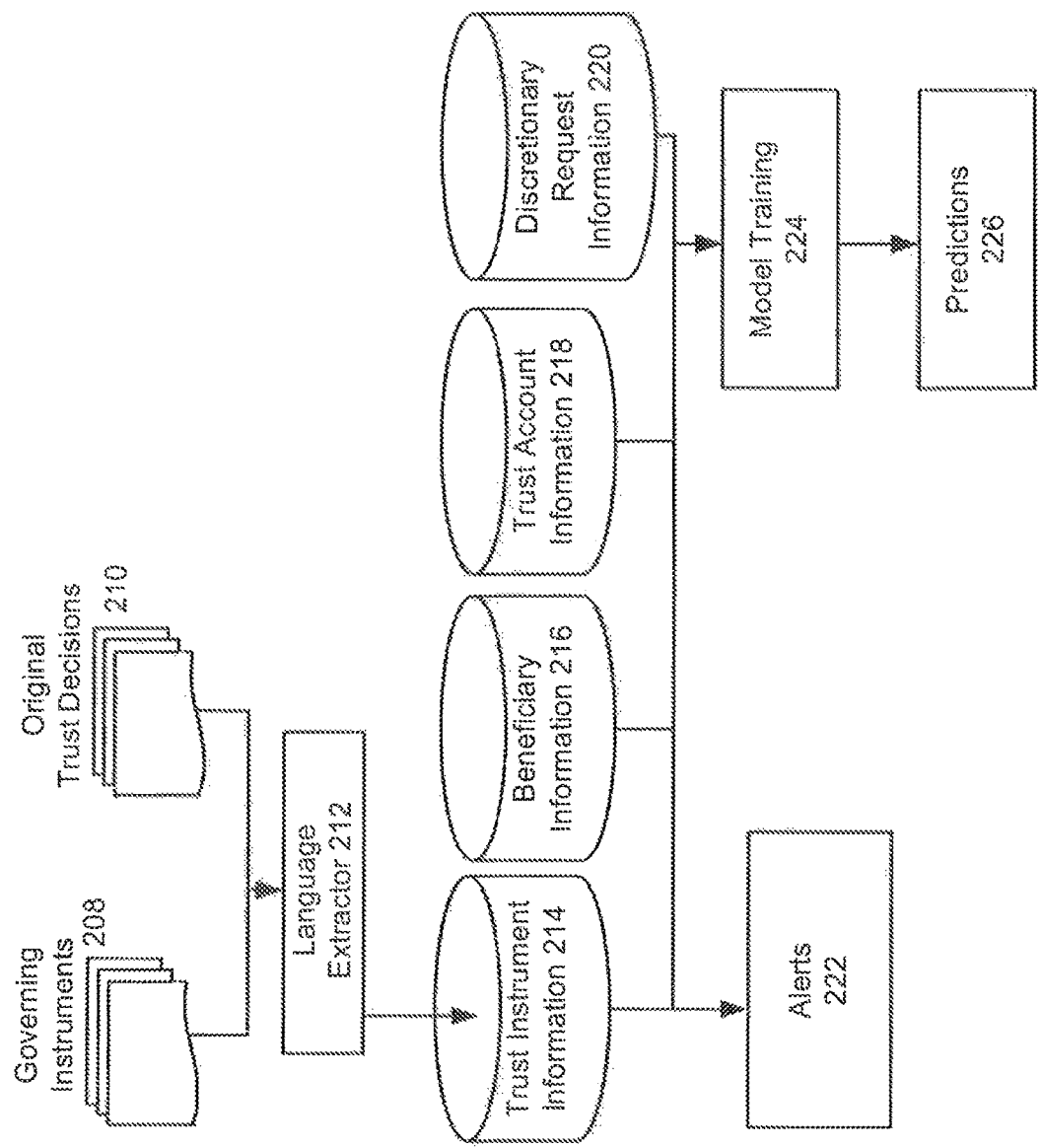
FIG. 2 is an exemplary diagram of a data preprocessing and feature generation, according to an embodiment of the present invention.

FIG. 2 is an exemplary diagram of a data preprocessing and feature generation, according to an embodiment of the present invention. As shown in FIG. 2, governing instruments 208 and original trust decisions 210 may be analyzed by a language extractor 212. Extracted language, e.g., keywords may be stored in a Trust Instrument Information data store 214. Trust Instrument Information 214, Beneficiary Information 216, Trust Account Information 218 and Discretionary Request Information 220 may be used to generate Alerts 222 and for Model Training 224, which may then feed to generate Predictions 226. According to an exemplary illustration, the data from one or more of: Trust Instrument Information 214, Beneficiary Information 216, Trust Account Information 218 and Discretionary Request Information 220 may be converted to vectors, e.g., Featurized Vectors, that may be used to perform model training at 224. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

Figure 3:
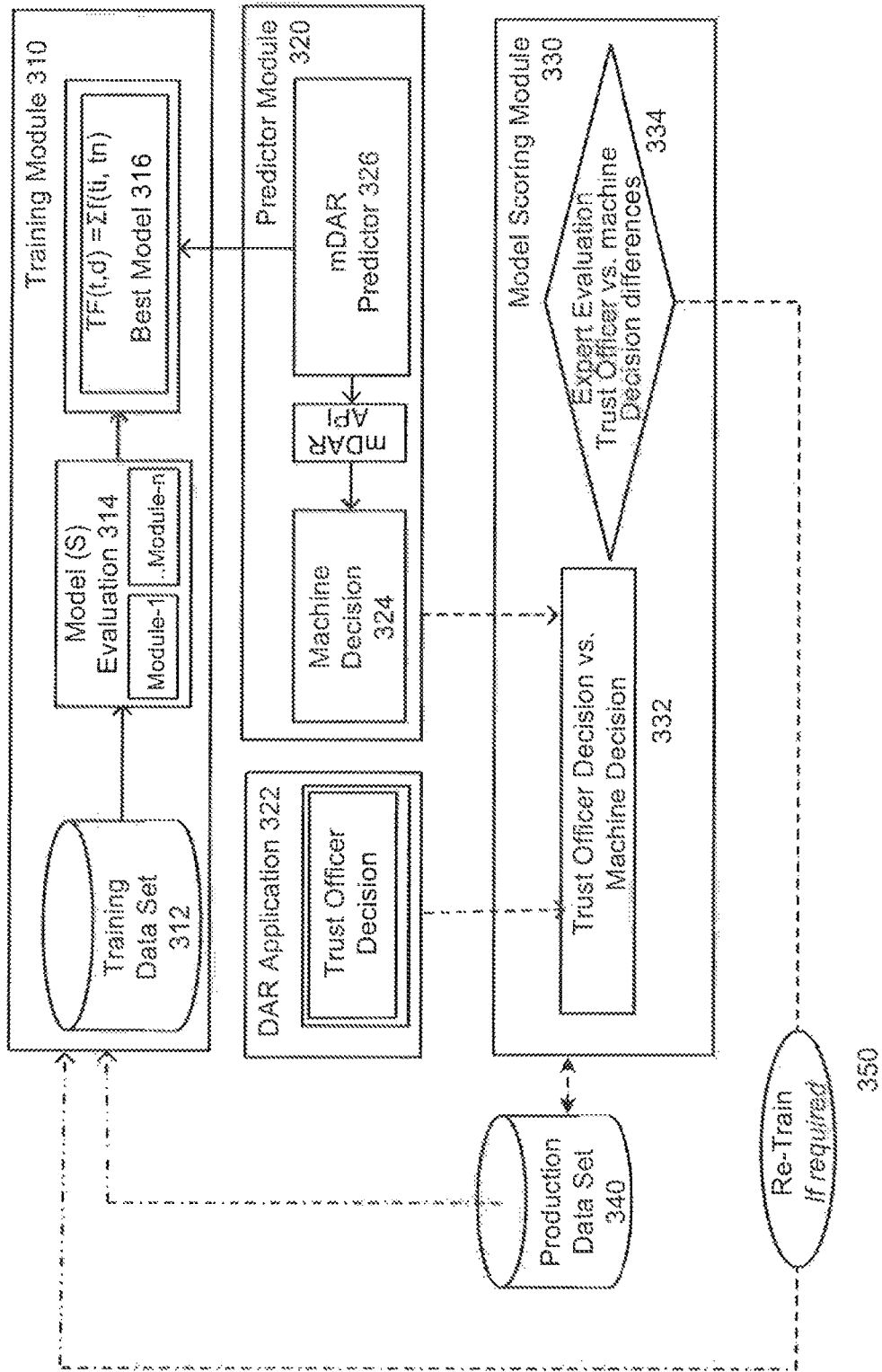
FIG. 3 is an exemplary diagram of machine learning in DAR process, according to an embodiment of the present invention.

FIG. 3 is an exemplary operationalization flow, according to an embodiment of the present invention. FIG. 3 illustrates a Training Module 310, a Predictor Module 320 and a Model Scoring Module 330. Training Module 310 may access training data set 312 for model evaluation 314 to identify a best model at 316. Predictor Module 320 may include a Predictor 326 and apply Machine Learning 324. Model Scoring Module 330 may evaluate Trust Officer Decisions from DAR Application 322 and Machine Learning outputs at 332 and identify decision differences at 334. Production Data Set 340 may receive the output and provide data to Training Data set 312. A Re-Train process may be applied at 350. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

Figure 4:
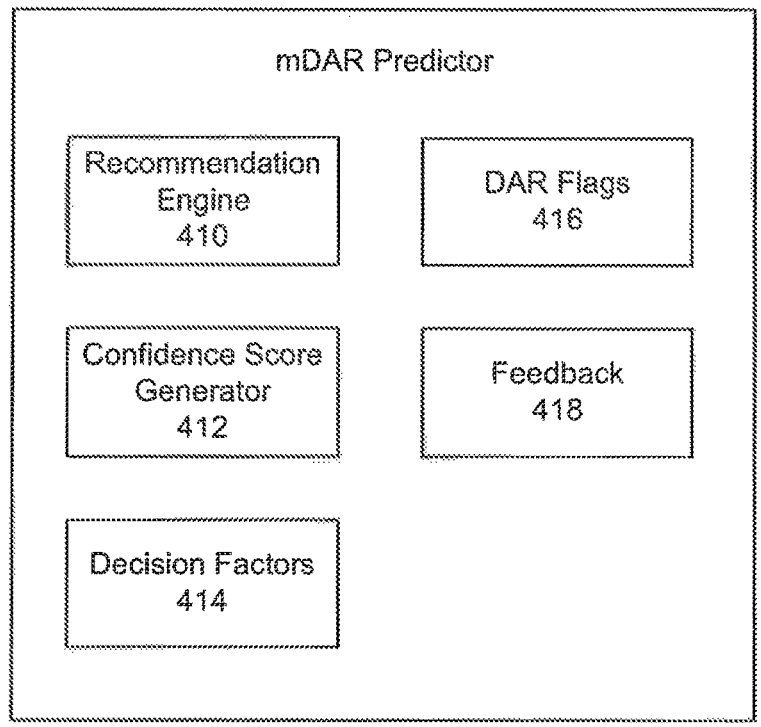
FIG. 4 is an exemplary illustration of a DAR Predictor, according to an embodiment of the present invention.

FIG. 4 is an exemplary illustration of a DAR Predictor, according to an embodiment of the present invention. An embodiment of the present invention may apply machine learning recommendation system that suggests an approval or denial of a discretionary action request (DAR). Machine Learning is a subfield of Artificial Intelligence where a machine's learning algorithm enables it to identify patterns in observed data, build models that explain the world, and predict things based on previous data and patterns. An embodiment of the present invention may apply Machine Learning to learn and build a model from historical DARs. For example, an embodiment of the present invention may learn from previous DAR decisions that the Trust Team has made by extracting the patterns and/or factors that have historically affected DAR decision making. The system may then make recommendations on new DARs based on what is has learned from prior DARs. For example, the system may use historical data (e.g., 10 years of DAR data) to build a Machine Learning model. The system may continuously learn from more DARs as these DARs are received.

According to an embodiment of the present invention, the system may include components comprising Recommendation Engine 410, Confidence Score Generator 412, Decision Factors 414, DAR Flags 416 and Feedback component 418. Recommendation Engine 410 may generate a Machine Recommended Approval or Denial of a DAR. Confidence Score Generator 412 may generate a score that represents confidence in approving or denying a DAR. Decision Factors 414 may represent factors that may be considered when making an approval or denial recommendation. DAR Flags 416 may represent special characteristics that may require it to be subject for review (e.g., special needs trust, high request amount, trust depletion, etc.). Feedback component 418 may represent a mechanism for an evaluator to input rationale for agreeing or disagreeing with a recommendation.

An embodiment of the present invention may make recommendations on cash distributions from Principal and Income Distributions.

According to an embodiment of the present invention, Decision Factors may include Request data, Beneficiary data, Trust characteristics, and Government Instrument.

Request data may include whether the request may be considered acceptable or appropriate (e.g., Acceptability, Appropriateness). Request data may consider purpose of the request. This may include a Request Category field in DAR or may be mined from Free Text. Request data may also consider Recipient of the Request. This may be an actual recipient of the requested Cash Distribution, which may be mined from Free Text or other source of data. Request data may also include an amount requested which may be represented as an amount requested, amount requested over trust market value, over an average amount approved for a purpose category and/or other indication of an amount or value. Request data may also encompass Distribution Details which may include source of cash distribution, type of cash distribution, etc.

Beneficiary data may represent a background validation. Beneficiary data may include general background (e.g., acceptable/questionable background of the beneficiary, as mined from Free Text or other source of data). Beneficiary data may also include a beneficiary's distribution history which may include most common requested purpose, total Amount already received, prior discretionary distributions, etc. Other resources available for the Beneficiary may also be considered. For example, beneficiary information may be identified from social media and other sources.

Trust characteristics may include a possible impact from requested distribution. Trust Details may include a number of beneficiaries, trust market value, liquidity, trust size category (e.g., large/medium/small).

Governing Instrument may consider any specific restrictions for distribution.

An embodiment of the present invention may make a recommendations with incomplete data however a corresponding confidence score may adjusted. In addition, a flag may be applied for additional review.

With an embodiment of the present invention, the data points that a Trust Officer has taken into consideration when making the decision may be stored and maintained in the pertinent DAR fields. In addition, attachments may be mentioned and summarized in the pertinent DAR fields. In addition, restrictions may be in the Relevant Discretionary Provisions. Relevant and requested documentation is uploaded.

An embodiment of the present invention is directed to facilitating standardized data collection used in decision making and further standardize factors that affect decision making. For example, an embodiment of the present invention may standardize data collection when recording a DAR thereby achieving a more robust record keeping practice.

An embodiment of the present invention may be integrated with other applications including a Trust and Estates business. For example, an embodiment of the present invention may provide a trust team with a historical view of how the Trust and Estates (T&E) business has decided on a similar DAR in the past.

An embodiment of the present invention may be directed to improving due diligence process by ensuring that known factors are taken into consideration in making a decision. For DARs that meet certain criteria that would qualify it as a low-risk DAR (e.g., dollar amount, etc.), an embodiment of the present invention may apply a check on these DARs and make a recommendation to proceed with the Trust Officer decision or recommend further analysis by the Team Lead. Other recommendations may be made as well.

Other variations may be implemented. For example, an embodiment of the present invention may use external sources to retrieve beneficiary information, such as sources of income, for validation. An embodiment of the present invention may provide a side-by-side comparison of a trust team decision and rationale with decision and decision factors. This may include prediction factors (e.g., type of cash distribution, amount approved, percentage of requested amount to trust market value, background for approval, source of cash distribution, etc.) and an indication of denial and approval.

An embodiment of the present invention may provide standardized feedback gathering tools for learning purposes.

This may include information concerning the request, trust situation, beneficiary background, governing instrument, etc.

Aside from identifying the rationale of the decision, an embodiment of the present invention may also determine where the data was received from. This may assist in addressing data gaps. For example, an embodiment of the present invention may provide the ability to identify a source of information through an interactive icon. Sources of information may include: information in DAR fields, information in DAR attachments, outside information (e.g., personal knowledge, phone call, conversation, etc.) and other sources.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements automated trust discretionary distribution decisions, the system comprising:
a memory that stores trust historical data; and
a computer server coupled to the memory, the computer server comprising a programmed computer processor configured to perform the steps of:
receiving, via an electronic input, a distribution request relating to a trust instrument, the distribution request including both structured data and unstructured data;
receiving, via a network a plurality of governing instruments and a first trust decision, in response to the distribution request;
extracting, from the plurality of governing instruments and the first trust decision and via natural language processing (NLP), a plurality of features, wherein the plurality of features includes one or more keywords, wherein the extracting includes constructing a graph of words occurring in a defined window, the graph representing a plurality of text entities with relations therebetween;
converting the extracted features into a plurality of featurized vectors for training of a machine learning model, wherein the plurality of featurized vectors includes labeled data;
first training, using the plurality of featurized vectors, the machine learning model;
applying, via the computer server, a trust decision predictor powered by the first trained machine learning model to the distribution request to generate a second trust decision;
presenting, via an electronic interface, the second trust decision generated by the first trained machine learning model;
determining a difference between the first trust decision and the second trust decision;
modifying the plurality of features on which the first training is performed to add or remove a feature for improving accuracy; and
second training the first trained machine learning model to address the determined difference between the first trust decision and the second trust decision, wherein the second training is performed based on the modified plurality of features.

2. The system of claim 1, wherein the trust decision predictor applies the machine learning model that is built from historical Discretionary Action Requests by extracting patterns and factors that affect Discretionary Action Request decision making.

3. The system of claim 1, wherein the trust decision predictor applies a confidence score that represents a confidence in approving or denying a Discretionary Action Request.

4. The system of claim 1, further comprising applying feedback data to refine the trust decision predictor,
wherein the feedback represents an input rationale for agreeing or disagreeing with a recommendation.

5. The system of claim 1, wherein the trust decision predictor generates a back-end funding decision for the distribution request.

6. The system of claim 1, wherein the trust decision predictor considers social media data to generate the second trust decision.

7. The system of claim 1, wherein the trust decision predictor applies flags that indicate additional review.

8. The system of claim 1, wherein the distribution request comprises a purpose of the request, recipient of the request, amount requested and distribution details.

9. The system of claim 1, wherein the trust decision predictor considers a set of decision factors comprising beneficiary details that include distribution history.

10. A method that implements automated trust discretionary distribution decisions, the method comprising the steps of:
receiving, via an electronic input, distribution request relating to a trust instrument, the distribution request including both structured data and unstructured data;
receiving, via a network a plurality of governing instruments and a first trust decision, in response to the distribution request;
extracting, from the plurality of governing instruments and the first trust decision and via natural language processing (NLP), a plurality of features, wherein the plurality of features includes one or more keywords, wherein the extracting includes constructing a graph of words occurring in a defined window, the graph representing a plurality of text entities with relations therebetween;
converting the extracted features into a plurality of featurized vectors for training of a machine learning model, wherein the plurality of featurized vectors includes labeled data;
first training, using the plurality of featurized vectors, the machine learning model;
applying, via a computer server, a trust decision predictor powered by the first trained machine learning model to the distribution request to generate a second trust decision;
presenting, via an electronic interface, the second trust decision generated by the first trained machine learning model;
determining a difference between the first trust decision and the second trust decision;
modifying the plurality of features on which the first training is performed to add or remove a feature for improving accuracy; and
second training the first trained machine learning model to address the determined difference between the first trust decision and the second trust decision, wherein the second training is performed based on the modified plurality of features.

11. The method of claim 10, wherein the trust decision predictor applies the machine learning model that is built from historical Discretionary Action Requests by extracting patterns and factors that affect Discretionary Action Request decision making.

12. The method of claim 10, wherein the trust decision predictor applies a confidence score that represents a confidence in approving or denying a Discretionary Action Request.

13. The method of claim 10, further comprising applying feedback data to refine the trust decision predictor,
wherein the feedback represents an input rationale for agreeing or disagreeing with a recommendation.

14. The method of claim 10, wherein the trust decision predictor generates a back-end funding decision for the distribution request.

15. The method of claim 10, wherein the trust decision predictor considers social media data to generate the second trust decision.

16. The method of claim 10, wherein the trust decision predictor applies flags that indicate additional review.

17. The method of claim 10, wherein the distribution request comprises a purpose of the request, recipient of the request, amount requested and distribution details.

18. The method of claim 10, wherein the trust decision predictor considers a set of decision factors comprising beneficiary details that include distribution history.

* * * * *